United States Patent
Watanabe et al.

(10) Patent No.: US 6,695,210 B2
(45) Date of Patent: Feb. 24, 2004

(54) BAR CODE READER AND BAR CODE READING METHOD

(75) Inventors: Mitsuo Watanabe, Kawasaki (JP); Motohiko Itoh, Kawasaki (JP); Hiroaki Kawai, Kawasaki (JP); Isao Iwaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 45 days.

(21) Appl. No.: 09/790,817

(22) Filed: Feb. 23, 2001

(65) Prior Publication Data

US 2001/0006192 A1 Jul. 5, 2001

Related U.S. Application Data

(63) Continuation of application No. PCT/JP99/00482, filed on Feb. 4, 1999, now abandoned.

(30) Foreign Application Priority Data

Aug. 24, 1998 (JP) .......................................... 10-237817

(51) Int. Cl.[7] ................................................ G06K 7/10
(52) U.S. Cl. .............................. 235/462.25; 235/462.12
(58) Field of Search ....................... 235/462.01, 462.12, 235/462.25, 454, 462.16

(56) References Cited

U.S. PATENT DOCUMENTS

| | | | | |
|---|---|---|---|---|
| 5,045,677 A | * | 9/1991 | Okamura ................ | 235/462.12 |
| 5,387,787 A | * | 2/1995 | Waldron et al. ............ | 235/462 |
| 5,457,308 A | * | 10/1995 | Spitz et al. .................. | 235/462 |
| 5,798,510 A | | 8/1998 | Watanabe et al. ........... | 235/462 |
| 5,929,421 A | * | 7/1999 | Cherry et al. .......... | 235/462.12 |
| 6,006,992 A | * | 12/1999 | Watanabe et al. ....... | 235/462.12 |
| 6,070,801 A | * | 6/2000 | Watanabe et al. ....... | 235/462.12 |
| 6,095,419 A | * | 8/2000 | Watanabe et al. ....... | 235/462.02 |

FOREIGN PATENT DOCUMENTS

| | | | |
|---|---|---|---|
| JP | 63-73488 | | 4/1988 |
| JP | 5-165996 | | 7/1993 |
| JP | 9-81663 | | 3/1997 |
| JP | 2001076088 A | * | 3/2001 |

\* cited by examiner

*Primary Examiner*—Michael G. Lee
*Assistant Examiner*—Jamara A. Franklin
(74) *Attorney, Agent, or Firm*—Westerman, Hattori, Daniels & Adrian, LLP

(57) ABSTRACT

A bar code data detecting section of a bar code reader scans a bar code twice or more and detects multiple pieces of bar code data, and a decoder decodes the bar code data, Then, a first judging section detects the overlapping part where first decoded data of the decoded in a first scanning trace and second decoded data in a second scanning trace overlap and judges whether or not the overlapping part is composed of a predetermined number of characters. If the overlapping part is composed of the predetermined number of characters, a second judging section judges whether or not the data in the overlapping part of the first decoded data is identical with that of the second decoded data. If the characters are the same, a fourth judging section judges whether or not the character just before the overlapping part of the first decoded data, the character just after the overlapping part of the second decoded data, and the characters constituting the overlapping part are all the same. If they are all the same, a synthesizing section does not combine the first and second decoded data from being generated.

7 Claims, 8 Drawing Sheets

FIG. 6

| WPC CODE | | | | |
|---|---|---|---|---|
| SGB (LGB) | LEFT-SIDE DATA BLOCK (6 OR 4 CHARACTERS) | CB | RIGHT-SIDE DATA BLOCK (6 OR 4 CHARACTERS) | EGB (RGB) |

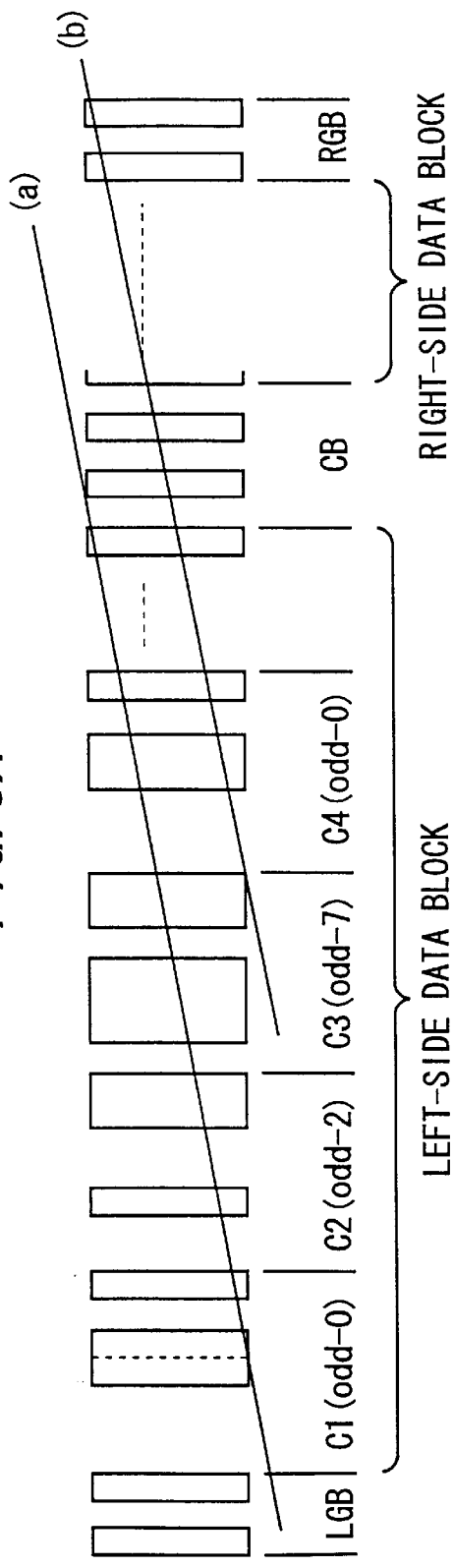

BAR CODE READER AND BAR CODE READING METHOD

This is a continuation of Application of PCT/JP 99/00482 filed on Feb. 4, 1999, now abandoned.

BACKGROUND OF THE INVENTION

1. Field of the Invention

The present invention relates to a bar code reader and a bar code reading method and, more particularly, to a bar code reader and a bar code reading method in which a bar code having a plurality of characters is read by partition reading.

2. Description of the Related Art

In recent years, as represented by POS systems in distributors, the management of goods or the like is generally performed by bar codes. For example, in a POS system of shops, information such as the type and a price of goods is coded into the format of a bar code, and the bar code is printed on the goods. Thereafter, checkout is performed by reading the bar code on a cash disk, and the number of sold goods are counted on real time. The number of sold goods is used in stock management and buying management.

Bar codes are roughly classified into a WPC code such as a JAN code, a UPC code, or an EAN code and a second code having a variable length. The WPC code, has, as shown in FIG. 6, a left guard bar (LGB: also called "start guard bar (SGB)") arranged on the left end, a center bar (CB) arranged at the center, and a right guard bar (RGB: also called "end guard bar (EGB)") arranged on the right end. A left-side data block constituted by 6 or 4 data characters (to be referred to as a "character" hereinafter) is formed between the LGB and the CB. A right-side data block constituted by 6 or 4 characters is formed between the CB and the RGB. The character is a minimum unit of coded numeral values or coded symbols, and is constituted by a plurality of modules.

Since the patterns of the LGB, CB, and the RGB are determined by standards, a bar code reader can detect the LGB, CB, and the RGB. The bar code reader can read the characters of a bar code on the basis of the LGB, the CB, and the RGB. The bar code reader reads the characters by three methods, i.e., a "continuous reading" method, a "block reading" method, and a "partition reading" method. The "continuous reading" method is a method in which, when an LGB, a CB, and an RGB are detected by performing a bar code scanning trace once, characters arranged between these bars are recognized as a bar code to be demodulated. The "block reading" method is a method in which only the block of characters arranged between an LGB or an RGB and a CB is recognized as a bar code, two blocks are independently demodulated, the demodulated data of the blocks are synthesized (coupled) with each other, and data modulated into one bar code is reproduced. The "partition reading" method is a method in which even a character string connected to at least one guard bar or center bar is recognized as a bar code, the pieces of demodulated data of these characters which are independently read are synthesized with each other, and data corresponding to one entire bar code is reproduced.

By the manner of passing of a scanning beam through a bar code, as shown in FIGS. 7A, 7B and 7C, partition reading methods are classified into three methods (1) a "2-partition" method (see FIG. 7A) in which demodulated data including only an LGB and demodulated data including a CB and an RGB are detected and synthesized with each other to acquire the data of the entire bar code, (2) a "3-1-partition" method (FIG. 7B) in which demodulated data including only an LGB, demodulated data including only a CB, and demodulated data including only an RGB are detected and synthesized with each other to acquire the data of the entire bar code, and (3) a "3-2-partition" method (see FIG. 7C) in which demodulated data including only an LGB, demodulated data including only a CB, and demodulated data including the CB and an RGB are detected and synthesized with each other to acquire the data of the entire bar code.

In a conventional partition reading method, when the demodulated data of a data block is formed by synthesizing two demodulated data, the following methods are employed. More specifically, when a left-side data block is formed by synthesis, demodulated data to be synthesized are compared with each other, two characters overlap (in the example shown in FIGS. 7A, 7B and 7C, the third and fourth characters overlap), and it is checked whether these characters are the same or not. At this time, when the two overlapping characters are the same, the demodulated data are synthesized with each other.

Here, when the process is performed in the "2-partition" method, the demodulated data of the entire bar code is obtained at this time. On the other hand, when the process is performed in the "3-1-partition" method or the "3-2-partition" method, modulated data synthesized by the process is synthesized with other modulated data to acquire the modulated data of the entire bar code. Thereafter, character count check and modulus check are performed to the demodulated data of the entire bar code. When preferable check results are obtained, the demodulated data are handled as normal demodulated data.

However, the above method has the following problem. For example, as shown in FIG. 8A, it is assumed that there is a bar code (UPC/A code) in which data blocks each constituted by 6 characters are stored between an LGB and a CB and between the CB and an RGB. This bar code has data of "027000 388150".

In this case, it is assumed that the bar code is scanned by a scanning beam (a) and a scanning beam (b). The scanning means (a) enters from the middle of the first character of the left-side data block, and does not passes through the CB. On the other hand, the scanning beam (b) passes from the fourth character of the left-side data block to the RGB. At this time, when the bright/dark pattern of the first character of the part through which the scanning beam (a) passes is the same as the bright/dark pattern of the LGB, the first character is erroneously recognized as an LGB (called a "bit shift"). As a result, the pieces of demodulated data obtained by the scanning beam (a) serve as an LGB, a first character (C1 (O-2)) a second character (C2 (O-7)), a third character (C3 (O-0)) a fourth character (C4 (O-0)), and a fifth character (C5 (O-0)). On the other hand, the pieces of demodulated data obtained by the scanning beam (b) serve as a fourth character (C4 (O-0)), a fifth character (C5 (O-0), a sixth character (C6 (O-0)), a CB, characters of a right-side data block, and an RGB.

The pieces of the two modulated data have overlapping parts with respect to the fourth and fifth blocks of a left-side block. In the normal code of the left-side data block, overlapping parts are the same as shown in FIG. 8B because the fourth to sixth characters are 0. For this reason, the pieces of these demodulated data are synthesized with each other as appropriate demodulated data, erroneous read data "270000 388150" is formed.

Thereafter, character count check and modulus check (modulus 10/weight 3) are performed to the erroneous read data, a judgment about accuracy is made. However, the error demodulated data has the accurate number of characters of a data block and an accurate modulus check result. For this reason, it cannot be detected that the data is erroneous read data.

SUMMARY OF THE INVENTION

It is an object of the present invention to provide a bar code reader and a bar code reading method which can prevent a bar code from being erroneously read by a bit shift when a bar code is read by a partition reading method.

The present invention employs the following configuration to accomplish the above-mentioned object. More specifically, the present invention is a bar code reader. This bar code reader comprises a bar code data detecting unit for scanning a bar code constituted by a plurality of characters at least twice to detect bar code data on the scanning locus, a demodulating section for demodulating respective bar code data detected by the bar code data detection section, a first judging section for detecting overlapping parts between first demodulated data on a first scanning locus and second demodulated data on a second scanning locus of the demodulated data demodulated by the demodulating section to judge whether the overlapping parts are constituted by a predetermined number of characters or not, a second judging section for, when it is judged by the first judging section that the overlapping parts are constituted by a predetermined number of characters, judging whether the overlapping parts are the same between the first demodulated data and the second demodulated data or not, a third judging section for, when it is judged by the second judging section that the overlapping parts are the same, judging whether the characters constituting the overlapping parts are the same or not, and a fourth judging section for, when it is judged by the third judging section that the characters are the same, judging whether a character just before the overlapping part of the first demodulated data, a character just after the overlapping part of the second demodulated data, and characters constituting the overlapping parts are all the same or not.

The present invention further comprises a synthesizing section for synthesizing the first demodulated data and the second demodulated data, and may be designed such that, when it is judged by the fourth judging section that the characters are all the same, the synthesizing section does not synthesize the first demodulated data and the second demodulated data.

The first judging section of the present invention may be arranged such that the overlapping parts are constituted by a predetermined number of characters when the overlapping parts are constituted by two characters.

According to the present invention, the fourth judging section judges whether a character just before the overlapping part of the first demodulated data, a character just after the overlapping part of the second demodulated data, and the characters constituting the overlapping parts are all the same or not. At this time, when the characters are all the same, erroneous reading caused by a bit shift probably occurs. Therefore, for example, when it is judged by the fourth judging section that the characters are all the same, the synthesizing section does not synthesize the first demodulated data and the second demodulated data with each other. In this case, a bar code can be prevented from being erroneously read by a bit shift.

The fourth judging section may judge whether a character just before the character just before the overlapping part of the first demodulated data is the same as the characters or not, or whether a character just after the character just after the overlapping part of the second demodulated data is the same as the characters or not.

The bar code is, for example, a WPC code, an EAN code, a JAN code, or a UPC code and may have a data block constituted by 4 or more characters. In particular, the present invention is preferably used for, e.g., an EAN-13 code or a UPC/A code.

BRIEF DESCRIPTION OF THE DRAWINGS

FIG. 6 is a diagram for explaining a WPC code.

FIGS. 8A and 8B are diagrams showing a conventional problem.

DETAILED DESCRIPTION OF THE PREFERRED EMBODIMENT

The best mode of an embodiment for carrying out the invention will be described below with reference to the drawings.

<Configuration of Bar Code Reader>

Figure 1:
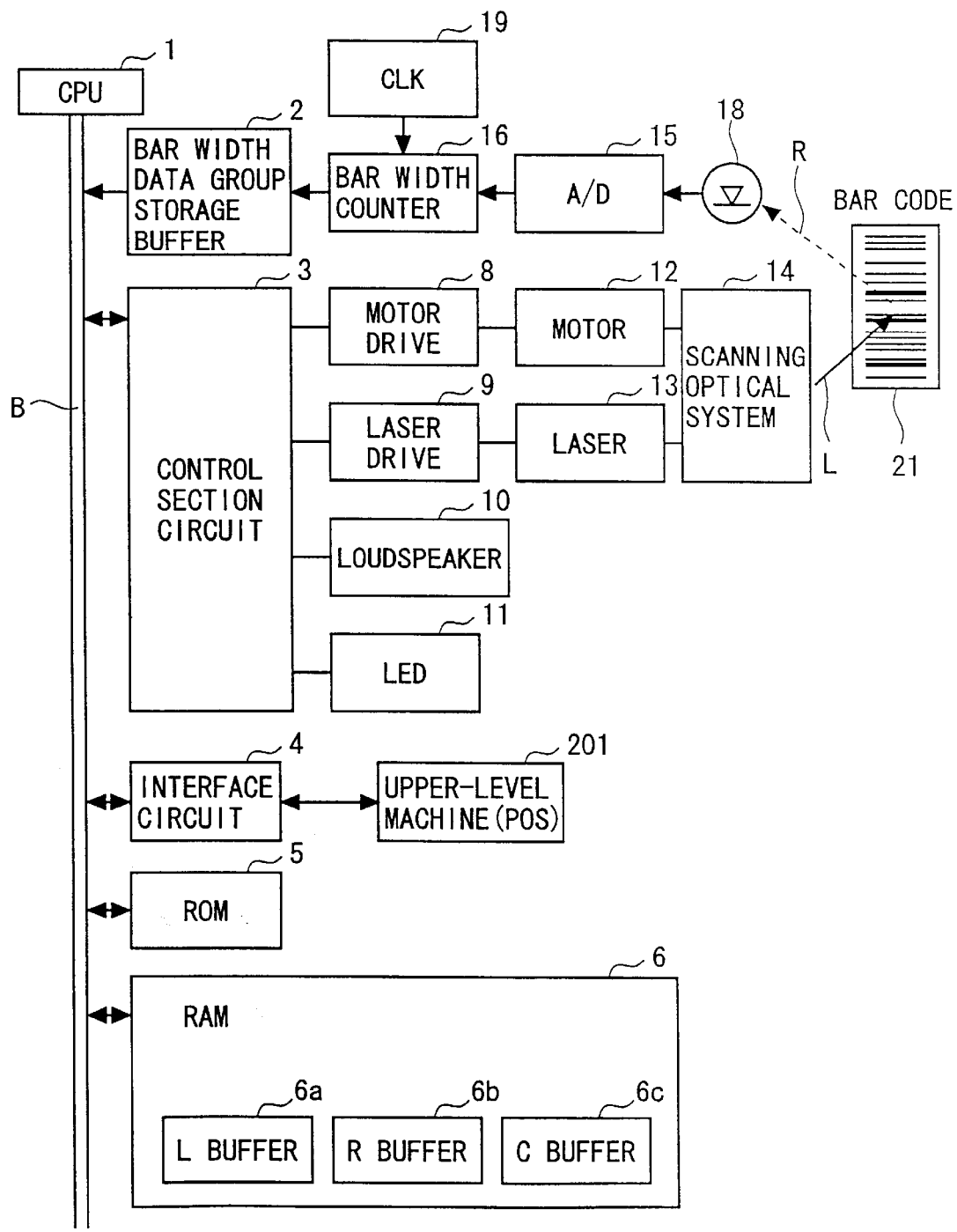
FIG. 1 is a diagram of the configuration of a bar code reader according to an embodiment of the present invention.

FIG. 1 is a block diagram showing a schematic configuration of a bar code reader according to the embodiment of the present invention. The bar code reader according to this embodiment reads a bar code 21 according to UPC/A and EAN-13 of the WPC code. The bar code 21 has guard bars, i.e., a left guard bar (LGB: start guard bar (SGB)) and a right guard bar (RGB: end guard bar (EGB)) and a center bar (CB), and has a data block (left-side data block) constituted by 6 characters arranged between the LGB and the CB and a data block (right-side data block) constituted by 6 characters arranged between the CB and the RGB (see FIG. 6).

In FIG. 1, the bar code reader has a CPU 1, a bar width data group storage buffer 2, a control section circuit 3, an interface circuit 4, a ROM 5, and a RAM 6 which are connected to each other through a bus B. The bar code reader has a bar width counter 16 connected to the bar width data group storage buffer 2, a clock 19 and an A/D converter 15 which are connected to the bar width counter 16, and a light-receiving element 18 connected to the A/D converter 15. In addition, the bar code reader has a motor drive circuit 8, a laser drive circuit 9, a loudspeaker 10 and an LED 11 respectively connected to the control section circuit 3, a motor 12 connected to the motor drive circuit 8, a scanning optical system 14 driven by the motor 12, and a semiconductor laser 13 connected to the laser drive circuit 9.

The ROM 5 is a read-only memory in which a bar code recognition/demodulation process program is stored. The CPU 1 executes the bar code recognition/demodulation process program stored in the ROM 5 to control the bar code reader as a whole, and demodulates bar width data groups obtained by reading the bar code 21 to reproduce data corresponding to the entire bar code 21. This CPU 1 functions as a demodulating section and first to fourth judging sections according to the present invention.

The interface circuit 4 controls the status of the bus B and controls data transmission or the like to an upper-level machine (host computer) (POS) 201.

The control section circuit 3 controls the motor drive circuit 8, the laser drive circuit 9, the loudspeaker 10, and the light-emitting diode (LED) 11. The motor drive circuit 8 drives the motor 12 to rotate polygon mirror (not shown) constituting the scanning optical system 14. The laser drive circuit 9 drives the semiconductor laser 13 to cause the semiconductor laser 13 to emit a laser beam L. The loudspeaker 10 generates sound representing the completion of read (demodulation) of the bar code. The LED 11 is a display element for displaying information such as the price or the like of a goods obtained as a result of demodulation of the bar code 21.

The laser beam L emitted from the semiconductor laser 13 is incident on the scanning optical system 14 and polarized by the scanning optical system 14. More specifically, the scanning optical system 14 polarizes the laser beam L in one direction by the polygon mirror (not shown) rotated by the motor 12. On the opposite side of the polygon mirror, a plurality of fixed mirrors. Therefore, the laser beam L polarized by the polygon mirror is reflected by the respective fixed mirrors again, so that the polarizing direction (scanning direction) of the laser beam is changed into various directions. According to the scanning optical system 14, laser beam scanning traces in a plurality of directions are continuously performed at a high speed within a polarizing cycle obtained by one reflective surface of the polygon mirror. Each of the plurality of laser beam scanning traces performed within the polarizing cycle obtained by one reflective surface of the polygon mirror will be called "one scanning trace" in the following description.

When the laser beam L scanned as described above is incident on the bar code 21, the laser beam L is diffused on the surface, and a part of the reflected light component R is received by the light-receiving element (photodiode) 18. The A/D converter 15 compares a current value representing the brightness of the reflected light component R received by the light-receiving element 18 with a predetermined threshold value, and converts the value into a binary signal. This binary signal represents "H" when the intensity of the reflected light component R corresponds to the reflectance of a black bar in the bar code 21, and represents "L" when the intensity of the reflected light component R corresponds to the reflectance of a white bar in the bar code 21.

The bar width counter 16 measures a time from the leading timing of the binary signal to the trailing timing (expected to correspond to the width of a black bar in the two-layered bar code 21) and a time from the leading timing of the binary signal to the trailing timing (expected to correspond to the width of a white bar in the two-layered bar code 21) based on the binary signal input from the A/D converter 15. The bar width counter 16 counts the number of clocks from the clock 19 for measuring the times corresponding to the bar widths. The read data (bar code data) of the bars output from the bar width counter 16 has a configuration obtained by combining the count value and a color identification signal representing white or black, and the read data are continuously output every scanning operation of the laser beam. The read data obtained every scanning operation continuously output in this manner is called a "bar width data group".

The bar width data group is temporarily stored in the bar width data group storage buffer 2. The bar width data group storage buffer 2 sequentially stores bar width data groups input from the bar width counter 16, and gives the bar width data groups to the CPU 1 one by one in the storage order at a request from the CPU 1.

The control section circuit 3, the motor drive circuit 8, the laser drive circuit 9, the motor 12, the semiconductor laser 13, the scanning optical system 14, the A/D converter 15, the bar width counter 16, the light-receiving element 18, the clock 19, and the bar width data group storage buffer 2 correspond to the bar code detection section according to the present invention.

The work area of the CPU 1 is developed in the RAM 6. The interface circuit 4 has an L buffer 6a, an R buffer 6b, and a C buffer 6c which are to temporarily store demodulated data obtained as results of a demodulation process for a bar width data group. In the L buffer 6a, demodulated data obtained when an LGB is detected or demodulated data obtained when an LGB and an RGB are detected by one scanning trace is stored. In the R buffer 6b, demodulated data obtained when an LGB is not detected but an RGB is detected is stored. In the C buffer 6c, demodulated data obtained when a CB is detected but an LGB and an RGB are not detected is stored.

Figure 2:
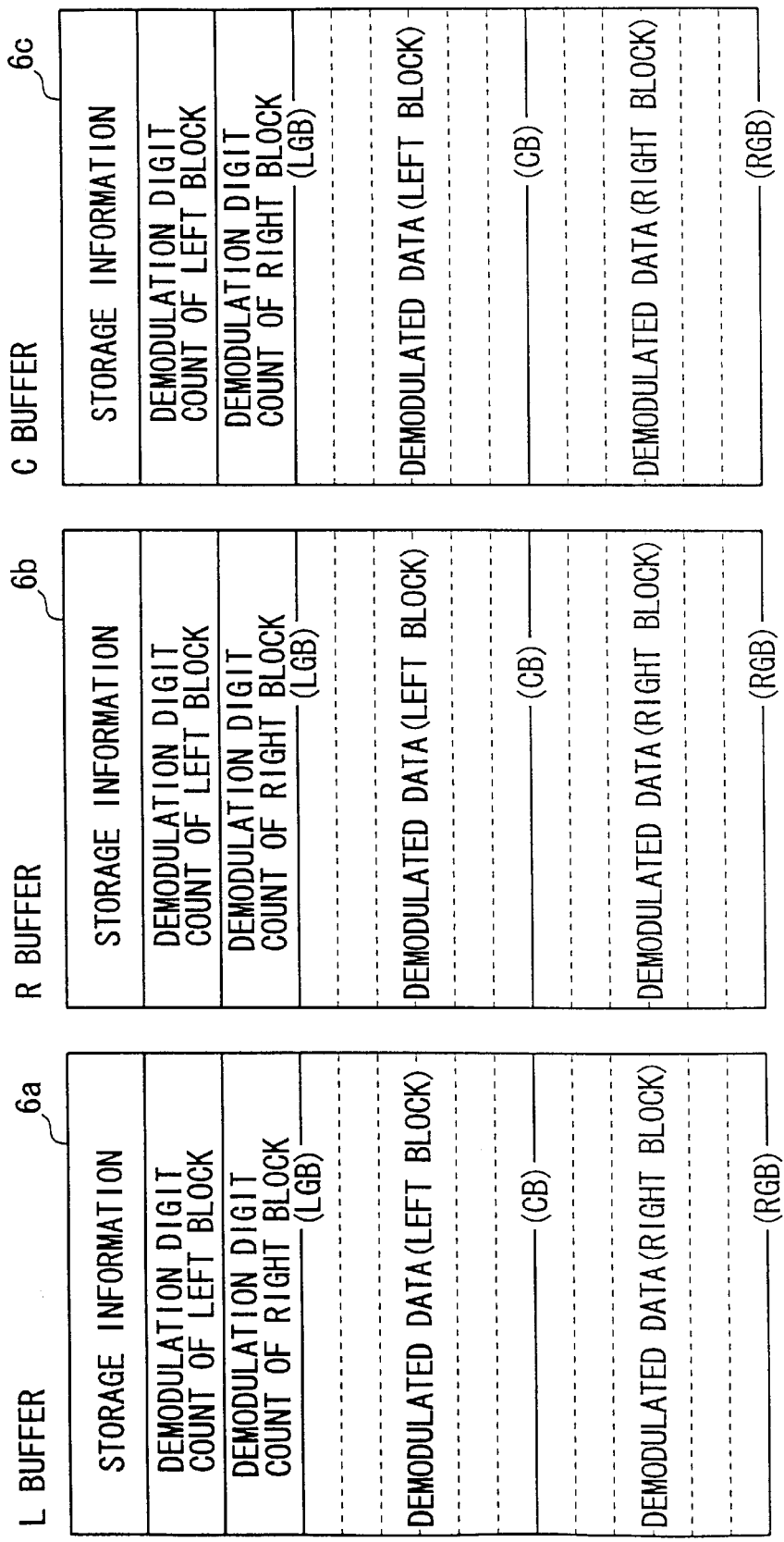
FIG. 2 is a diagram for explaining the buffers shown in FIG. 1.

FIG. 2 is a diagram for explaining the buffers 6a to 6c. As shown in FIG. 2, each of the buffers 6a to 6c has a storage capacity of 15 bytes and has storage areas for respectively storing storage information (1 byte), a demodulation digit count (1 byte) of a left-side data block, a demodulation digit count (1 byte) of a right-side data block, demodulated data (6 bytes) of the left-side data block, and demodulated data (6 bytes) of the right-side data block.

In this case, in the storage area for the storage information, a flag representing the presence/absence of storage of demodulation completion data, a flag representing a modulus check result of demodulated data, a flag representing whether the demodulated data is data in a dead zone, and the like are stored.

In the storage area for the demodulation digit count of the left-side data block, a digit count (the number of characters: any one of "1" to "6") of the demodulated data stored in the storage area of the demodulated data of the left-side data block is stored. When the demodulated data is obtained when the LGB and the CB are detected, all the characters of the demodulated data, the LGB, and the left-side data block are detected. However, "7" is stored to discriminate the demodulated data from demodulated data obtained when the CB is not detected.

In the storage area of the demodulation digit count of the right-side data block, a digit count (the number of characters: any one of "1" to "6") of the demodulated data of the right-side data block is stored. When the demodulated data is obtained when the RGB and the CB are detected, all the characters of the demodulated data, the RGB, and the right-side data block are detected. However, "7" is stored to discriminate the demodulated data from demodulated data obtained when the CB is not detected.

The demodulated data are stored in the storage areas of the demodulated data of the left-side data block and the right-side data block depending on the positions of the characters.

<Bar Code Recognition/Demodulation Process>

The concrete contents of the bar code recognition/demodulation process stored in the ROM 5 and executed by the CPU 1 will be described on the basis of the flow charts FIGS. 3 and 4. The flow chart in FIG. 3 which is the main routine of the bar code recognition/demodulation process is started such that a main power of the bar code reader is turned on, and a bar width data group is stored in the bar width data group storage buffer 2.

First, the CPU 1 sequentially extracts a plurality of bar width data groups from the bar width data group storage buffer 2, demodulation processes for the bar width data groups are executed (S01). More specifically, the CPU 1 detects an LGB, a CB, and an RGB from the bar width data groups. When the CPU 1 detects any one of the bars, character length check of the bar width data of the bar is performed, the number of effective characters is calculated, and demodulated data corresponding to the number of effective characters is demodulated.

Subsequently, the CPU 1 stores the demodulated data demodulated in step S01 in any one of the L buffer 6*a*, the R buffer 6*b*, and the C buffer 6*c* depending on the state of the demodulated data (detection states of the LGB, the RGB, and the CB) (S02).

The CPU 1 judges synthesis methods for the demodulated data stored in the buffers 6*a* to 6*c* on the basis of the demodulation digit counts of the data blocks stored in the buffers 6*a* to 6*c* (S03). More specifically, when the demodulation digit count of the left-side data block and the demodulation digit count of the right-side data block in the L buffer 6*a* are "7" each, the CPU 1 understands that the demodulated data stored in the L buffer 6*a* is demodulated data obtained when an LGB, a CB, and an RGB are detected by one scanning trace (entire bar code is detected), and the CPU 1 judges the synthesis method as a continuous reading method. In contrast to this, when the demodulation digit count of the left-side data block of the L buffer 6*a* is "7", and when the demodulation digit count of the right-side data block of the R buffer 6*b* is "7", the CPU 1 judges the synthesis method as a block reading method.

In contrast to this, when the demodulation digit count of the left-side data block of the L buffer 6*a* and the demodulation digit count of the left-side data block of the R buffer 6*b* are "7" each, and the sum of the demodulation digit count of the right-side data block of the L buffer 6*a* and the demodulation digit count of the right-side data block of the R buffer 6*b* and the sum of the demodulation digit count of the left-side data block of the L buffer 6*a* and the demodulation digit count of the left-side data block of the R buffer 6*b* are "8" or more each, the CPU 1 judges the synthesis method as a "two-partition" method.

In addition, when the sum of the demodulation digit count of the left-side data block of the L buffer 6*a* and the demodulation digit count of the left-side data block of the C buffer 6*c* and the sum of the demodulation digit count of the right-side data block of the C buffer 6*c* and the demodulation digit count of the right-side data block of the R buffer 6*b* are "8" or more each, the CPU 1 judges the synthesis method as a "3-1-partition" method.

When the demodulation digit count of the left-side data block of the L buffer 6*a* and the demodulation digit count of the right-side data block of the R buffer 6*b* are "7" each, and when the sum of the demodulation digit count of the right-side data block of the C buffer 6*c* and the demodulation digit count of the right-side data block of the R buffer 6*b* is "8" or more, the CPU 1 judges the synthesis method as a "3-2-partition" method.

The CPU 1 judges whether the judging result obtained in step S03 is a continuous reading method or not (S04). At this time, when the judging result is the continuous reading method (S04; Y), the CPU 1 shifts the process to step S09, otherwise (S04; N), the CPU 1 shifts the process to step S05.

When the CPU 1 shifts the process to step S05, the CPU 1 judges whether the judging result in step S03 is a block reading method or not. At this time, when the judging result is the block reading method (SO5; Y), the CPU 1 shifts the process to step S08, otherwise (SO5; N), the CPU 1 understands the judging result as the partition reading method to shift the process to step S06.

Figure 4:
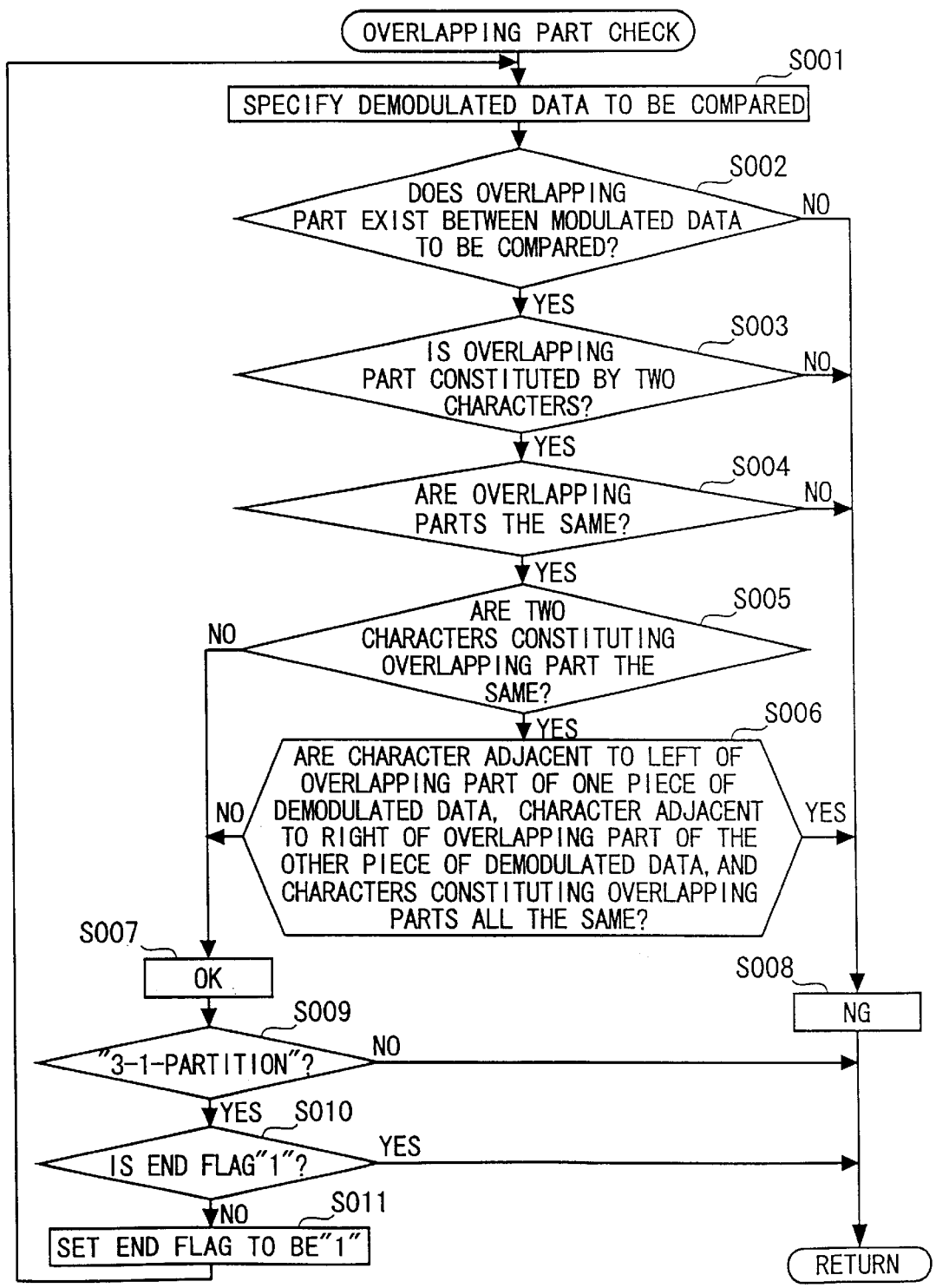
FIG. 4 is a flow chart showing the overlapping part check process shown in FIG. 3.

When the CPU 1 shifts the process to step S06, the CPU 1 executes a sub-routine for overlapping part check (flow chart in FIG. 4). In FIG. 4, first, the CPU 1 specifies two demodulated data to be synthesized (to be compared) according to the judging result of the synthesis results (S001).

At this time, the synthesis method is a "2-partition" method, the CPU 1 specifies the demodulated data in the L buffer 6*a* as one piece of demodulated data (corresponding to the first demodulated data of the present invention), and specifies the demodulated data in the R buffer 6*b* as the other modulated data (corresponding to the second demodulated data of the present invention). In contrast to this, when the synthesis method is a "3-2-partition" method, the CPU 1 specifies the demodulated data in the L buffer 6*a* as one piece of demodulated data, and specifies the demodulated data in the C buffer 6*c* as the other piece of demodulated data.

In contrast to this, when the synthesis method is a "3-1-partition" method, the CPU 1 performs the following process. More specifically, the CPU 1 read the state of the end flag of predetermined overlapping part check. At this time, when the end flag is "0", the CPU 1 specifies the demodulated data in the L buffer 6*a* as one piece of demodulated data, and specifies the demodulated data in the C buffer 6*c* as the other piece of demodulated data. In contrast to this, when the end flag is "1", the CPU 1 specifies the demodulated data in the C buffer 6*c* as one piece of demodulated data, and specifies the demodulated data in the R buffer 6*b* as the other piece of demodulated data.

The end flag is designed to be set at "0" upon completion of execution of the sub-routine.

Subsequently, the CPU 1 compares the two pieces of demodulated data specified in step S001 to judge whether overlapping parts (overlapping digits (characters)) exist between the data blocks to be synthesized (S002). At this time, when no overlapping parts exist (S002; N), the CPU 1 judges that the overlapping part check is no good (S008), and ends the execution of the sub-routine. In contrast to this, when the overlapping parts exist (S002; Y), the CPU 1 shifts the process to step S003.

When the CPU 1 shifts the process to step S003, the CPU 1 judges whether the overlapping parts are constituted by two characters or not. At this time, when the overlapping parts are not constituted by two characters (S003; N), the CPU 1 judges that the overlapping part check is no good (S008), and ends the execution of the sub-routine. In contrast to this, when the overlapping parts are constituted by two characters (S003; Y) the CPU 1 shifts the process to step S004.

When the CPU 1 shifts the process to step S004, the CPU 1 judges whether the overlapping parts are the same or not. At this time, when the overlapping parts are not the same (S004; N), the CPU 1 judges that the overlapping part check is no good (S008), and ends the execution of the sub-routine. In contrast to this, when the overlapping parts are the same (S004; Y), the CPU 1 shifts the flow to S005.

When the CPU 1 shifts the process to step S005, the CPU 1 judges whether the two characters constituting the overlapping part of one or the other piece of demodulated data are the same or not. At this time, when the two characters are not the same (S005; N), the CPU 1 shifts the process to step S007. In contrast to this, when the two characters are the same (S006; Y), the CPU 1 shifts the process to step S006.

When the CPU 1 shifts the process to step S006, the CPU 1 judges whether a character adjacent to the left of the overlapping part of one piece of demodulated data, a character adjacent to the right of overlapping part of the other piece of demodulated data, and the characters constituting the overlapping parts of one and the other pieces of demodulated data are all the same or not. At this time, when the characters are all the same (S006; Y), the CPU 1 understands that the demodulated data are erroneous read data generated by a bit shift, judges that the overlapping part check is no good (S008), and ends the execution of the sub-routine. In contrast to this, when the characters are not all the same (SO06; N), the CPU 1 shifts the process to step S007.

When the CPU 1 shifts the process to step S007, the CPU 1 understands that one piece of demodulated data and the other piece of demodulated data satisfy the conditions for synthesis (coupling), judges that the overlapping part check is OK, and shifts the process to step S009.

When the CPU 1 shifts the process to step S009, the CPU 1 judges the judging result in step S03 is a "3-1-partition" method or not. At this time, when the judging result is not the "3-1-partition" method (S009; N), the CPU 1 ends the execution of the sub-routine. In contrast to this, when the judging result is "13-1-partition" method (S009; Y), the CPU 1 shifts the process to step S010.

When the CPU 1 shifts the process to step S010, the CPU 1 judges whether the end flag of the overlapping part check is "1" or not. At this time, when the end flag is "1" (S010; Y) the CPU 1 understands that the overlapping part check for two portions in the "3-1-partition" method is ended, and ends the execution of the sub-routine. In contrast to this, when the end flag is not "1" (is "0") (S010; Y), the CPU 1 sets the end flag to be "1" (S011) and then returns the process to step S001.

Figure 5:
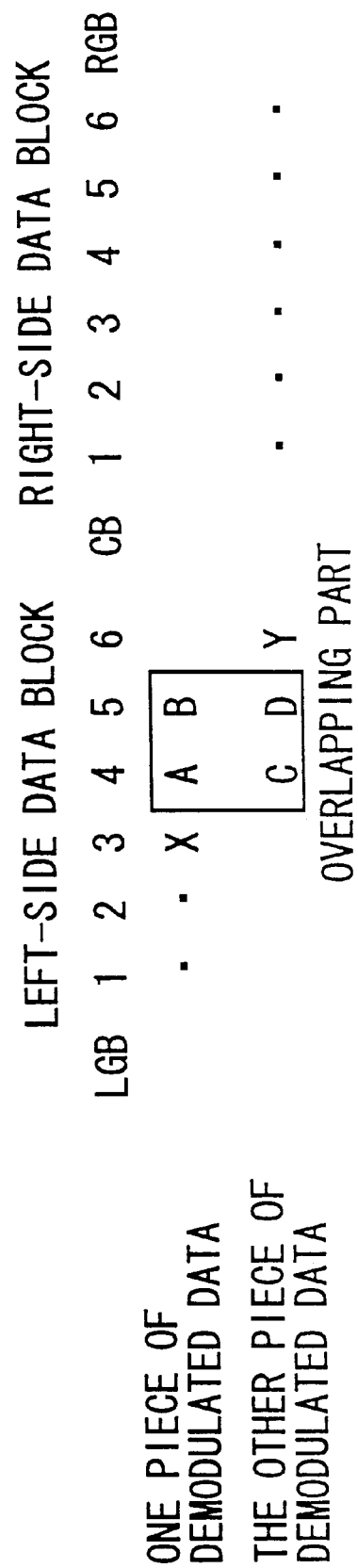
FIG. 5 is a diagram for explaining a concrete example of the overlapping part check process shown in FIG. 4.
Figure 7A:
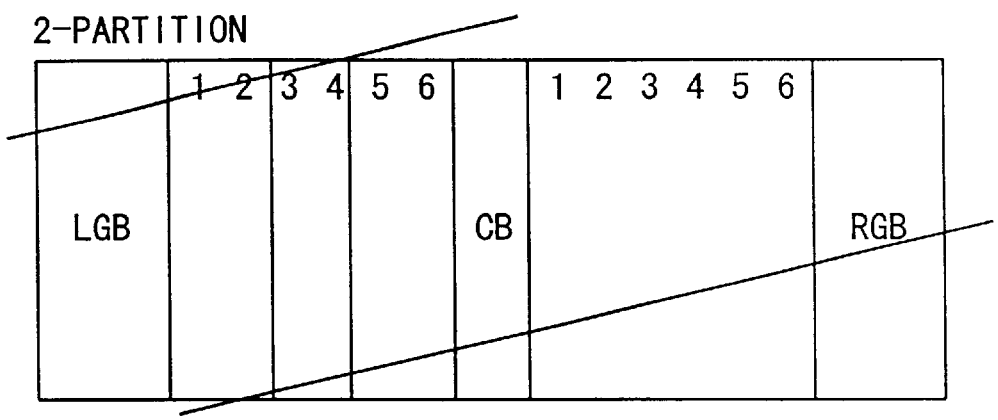
FIGS. 7A, 7B and 7C are diagrams for explaining partition reading.
Figure 7B:
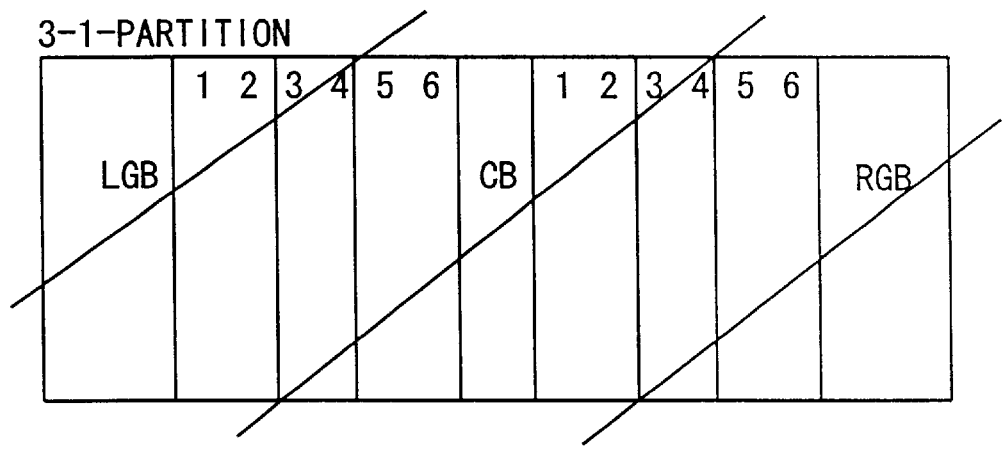
Figure 7C:
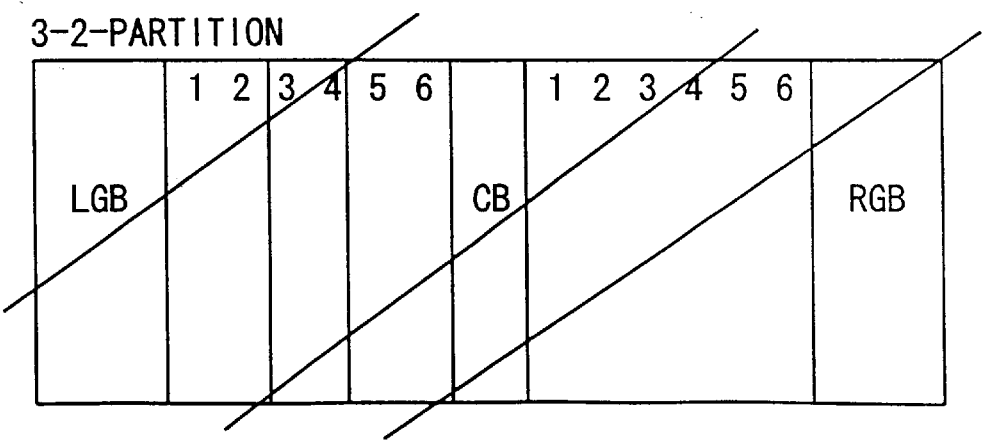

FIG. 5 is a diagram for explaining a concrete example of a process performed by a sub-routine for overlapping part check. In the example shown in FIG. 5, it is assumed that demodulated data of the first to fifth characters ". . . XAB" of a left-side data block is specified as one piece of demodulated data and that demodulated data including the fourth to sixth characters "CDY" of the left-side data block is specified as the other piece of demodulated data according to the process of step S001.

In this case, "AB" of one piece of demodulated data and "CD" of the other piece of demodulated data are specified as overlapping parts (S002; Y), and it is judged that the overlapping parts are constituted by two characters (S003; Y). It is judged whether the overlapping part "AB" and the overlapping part "CD" are the same or not (S004). At this time, when "AB" and "CD" are the same (S004; Y), it is judged that the two characters constituting the overlapping part "AB", i.e., "A" and "B" are the same or not (S005). At this time, when it is judged that "A" and "B" are the same (S005; Y), "C" and "D" are understood as the same characters.

Thereafter, it is judged whether a character (third character) "X" adjacent to the left of the overlapping part "AB" and "A" (or "B") are the same and a character (sixth character) "Y" adjacent to the right of the overlapping part "CD" and "A" (any one of "B", "C", and "D") are the same or not (S006). At this time, when "X"="A" (any one of "B", "C", and "D")="Y" is satisfied (S006; Y), it is judged that the overlapping part check is no good in step S008.

Figure 3:
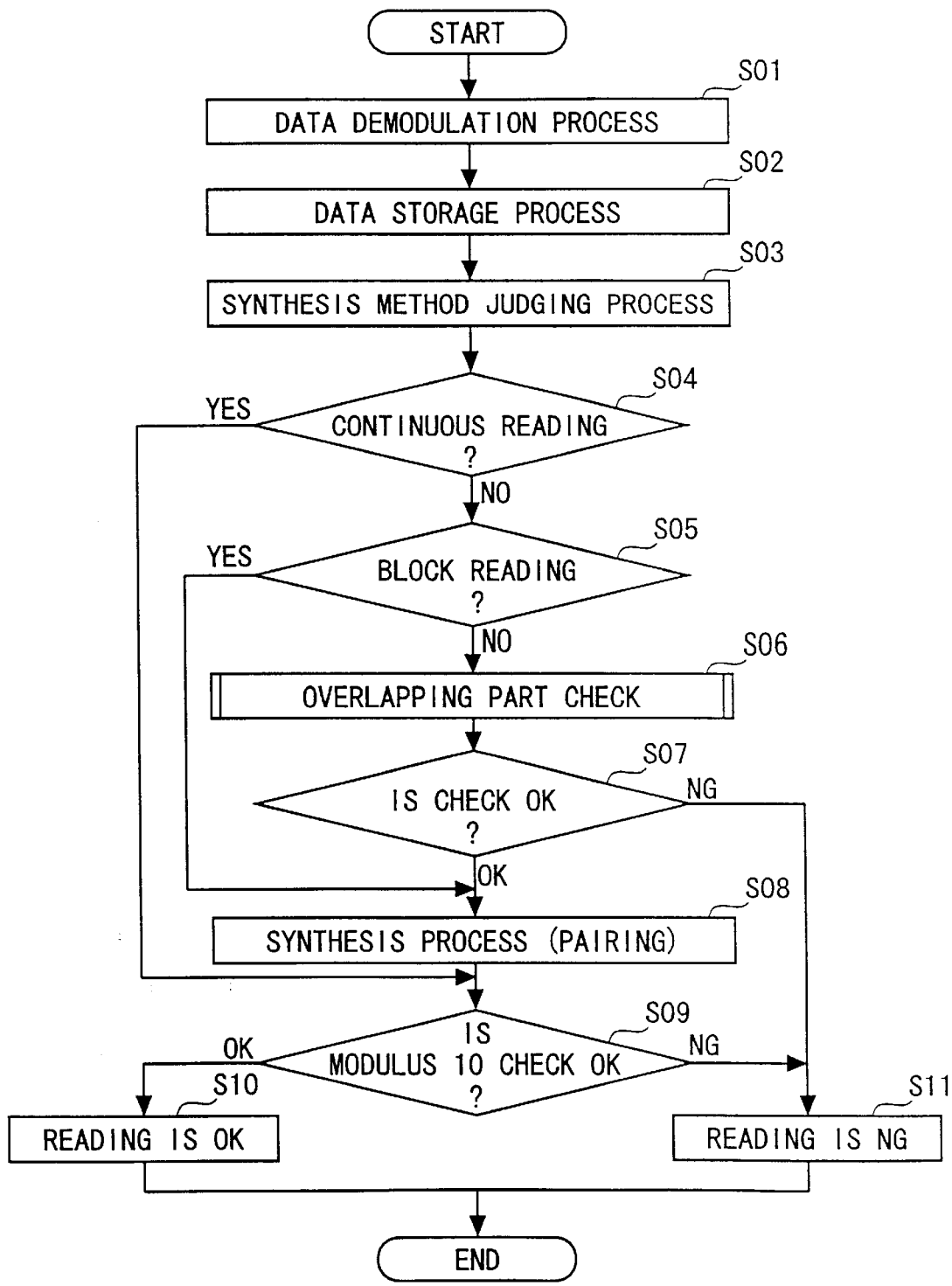
FIG. 3 is a flow chart showing processes performed by the CPU shown in FIG. 1.

Upon completion of the sub-routine for overlapping part check, the CPU 1 shifts the process to step S07 of the main routine (see FIG. 3). In step S07, the CPU 1 judges whether the overlapping part check result is OK or no good. At this time, when the check result is no good (S07; NG), the CPU 1 shifts the process to step S11. In contrast to this, when the check result is OK (S07; OK), the CPU 1 shifts the process to step S08.

In step S08, the CPU 1 performs the synthesis process (pairing) of the demodulated data stored in the buffers 6a to 6c to form the demodulated data of the entire bar code. Subsequently, the CPU 1 performs modulus 10 check with respect to the formed demodulated data in step S08, and judges whether the check result is OK or no good (S09). At this time, when the check result is OK (S09; OK), the CPU 1 shifts the process to S10. In contrast to this, when the check result is no good (S09; NG), the CPU 1 shifts the process to S11.

When the process is shifted to step S10, the CPU 1 understands that reading of the bar code 21 is OK, causes the loudspeaker 10 to generate sound representing the completion of reading of the bar code 21, and displays information based on the demodulation result of the bar code 21 on the LED 11. The CPU 1 gives an instruction for transferring the demodulation result of the bar code 21 to the upper-level machine 201 to the interface circuit 4. Thereafter, the CPU 1 end the processes of the main routine.

When the process is shifted to step S11, the CPU 1 understands that reading of the bar code 21 is no good, causes the loudspeaker 10 to generate sound representing the completion of reading of the bar code 21, and displays that the demodulation of the bar code 21 is no good (that reading is no good) on the LED 11. Thereafter, the CPU 1 ends the processes of the main routine.

<Operation of Embodiment>

According to the bar code reader of this embodiment, when a character adjacent to the left of the overlapping part of one piece of demodulated data, a character adjacent to the right of the overlapping part of the other piece of demodulated data, and the characters constituting the overlapping parts of one and the other demodulated data are all the same in the overlapping part check process (see FIG. 4), the demodulated data is handled as erroneous read data generated by a bit shift, and reading of the bar code 21 is no good.

More specifically, in the example shown in FIGS. 8A and 8B, since all the third to sixth characters after synthesis are "0", the third to sixth characters are handled such that the synthesis conditions for demodulated data are not satisfied. For this reason, reading of the bar code 21 is performed by a demodulation synthesis process using another bar width data group. Therefore, when partition reading is performed, the bar code 21 can be prevented from being erroneously read by a bit shift.

What is claimed is:

1. A bar code reader comprising:
   a bar code data detecting unit for scanning a bar code constituted by a plurality of characters at least twice to detect bar code data on a scanning locus;
   a demodulating section for demodulating respective bar code data detected by the bar code data detection section;
   a first judging section for detecting overlapping parts between first demodulated data on a first scanning locus and second demodulated data on a second scanning locus of the demodulated data demodulated by the demodulating section to judge whether the overlapping parts are constituted by a predetermined number of characters or not;
   a second judging section for, when a judgement is made by the first judging section that the overlapping parts are constituted by a predetermined number of characters, judging whether the overlapping parts are the same between the first demodulated data and the second demodulated data or not;

a third judging section for, when a judgement is made by the second judging section that the overlapping parts are the same, judging whether the characters constituting the overlapping parts are the same or not; and a fourth judging section for, when a judgement is made by the third judging section that the characters are the same, judging whether a character just before the overlapping part of the first demodulated data, a character just after the overlapping part of the second demodulated data, and characters constituting the overlapping parts are all the same value or not.

2. A bar code reader according to claim 1, further comprising a synthesizing section for synthesizing the first demodulated data and the second demodulated data, and wherein when a judgement is made by the fourth judging section that the characters are all the same, the synthesizing section does not synthesize the first demodulated data and the second demodulated data.

3. A bar code reader according to claim 1, wherein the bar code is an EAN-13 code or a UPC/A code.

4. A bar code reader according to claim 1, wherein the first judging section judges that the overlapping parts are constituted by a predetermined number of characters when the overlapping parts are constituted by two characters.

5. A method for reading a bar code, comprising:

a first step of scanning a bar code constituted by a plurality of characters at least twice to detect bar code data on a scanning locus;

a second step of demodulating respective bar code data detected in the first step;

a third step of comparing first demodulated data on a first scanning locus and second demodulated data on a second scanning locus of the demodulated data demodulated in the second step and for, when the first demodulated data and the second demodulated data have overlapping parts, judging whether the overlapping parts are constituted by a predetermined number of characters or not;

a fourth step of, when a judgement is made in the third step that the overlapping parts are constituted by a predetermined number of characters, judging whether the overlapping parts are the same between the first demodulated data and the second demodulated data or not;

a fifth step of, when a judgement is made in the fourth step that the overlapping parts are the same, judging whether the characters constituting the overlapping parts are same or not; and a sixth step of, when a judgement is made in the fifth step that the characters are the same, judging whether a character just before the overlapping part of the first demodulated data, a character just after the overlapping part of the second demodulated data, and characters constituting the overlapping parts are all the same value or not.

6. A method according to claim 5, further comprising a seventh step of synthesizing the first demodulated data and the second demodulated data, and wherein the seventh step is not performed when a judgement is made that the characters are all the same in the sixth step.

7. A bar code reader comprising:

a bar code data detecting section for scanning a bar code constituted by a plurality of characters at least twice to detect bar code data on the scanning locus;

a first judging section for detecting overlapping parts between first bar code data on a first scanning locus and second bar code data on a second scanning locus of the bar code data;

a second judging section for judging whether the respective characters constituting the overlapping parts detected by the first judging section are the same; and a third judging section for, when a judgement is made by the second judging section that the characters are same, judging whether a character just before the overlapping part of the first bar code data, a character just after the overlapping part of the second bar code data, and characters constituting the overlapping parts are all the same value or not.

* * * * *